United States Patent [19]

Kampf

[11] 4,244,458
[45] Jan. 13, 1981

[54] SAMPLE VIAL GUIDE

[75] Inventor: Richard S. Kampf, Costa Mesa, Calif.

[73] Assignee: Beckman Instruments, Inc., Fullerton, Calif.

[21] Appl. No.: 812,310

[22] Filed: Jul. 1, 1977

[51] Int. Cl.² ............................................. B65G 47/00
[52] U.S. Cl. .................................. 198/339; 250/328; 308/3 R; 414/403
[58] Field of Search ................ 198/345, 339; 250/328; 308/3 R, 4 R; 193/38; 73/423 A; 214/301, 310, 1 BB; 414/403

[56]  References Cited

U.S. PATENT DOCUMENTS

| 3,172,149 | 3/1965 | Kornmayer | 214/1 BB X |
| 3,859,528 | 1/1975 | Luitwieler | 250/328 |

Primary Examiner—Robert B. Reeves
Assistant Examiner—Douglas D. Watts

Attorney, Agent, or Firm—R. J. Steinmeyer; Robert R. Meads; John R. Shewmaker

[57]  ABSTRACT

A sample vial guide for scintillation spectrometers or other sample handling systems in which sample vials are moved in a horizontal path to a first operating station, transferred vertically therefrom to a second station such as a radiation measuring chamber, and returned along the vertical path to the first station for continued movement along the horizontal path away from the first station. The sample vial guide includes first and second opposing jaws at the first station on opposite sides of the horizontal path and having opposing interior surfaces which surround and define a constrained area at the first station for a sample vial. The jaws are hinged to pivot laterally away from the horizontal path and include cam surfaces on each jaw for engaging a sample vial as it moves along the horizontal path to or from the first station to move the jaws to an open position to accommodate such horizontal movement of the vial.

7 Claims, 6 Drawing Figures

SAMPLE VIAL GUIDE

BACKGROUND OF THE INVENTION

1. Field of the Invention

The present invention relates to sample vial handling apparatus and, more particularly, to apparatus for guiding and stabilizing the movement of sample vials into position at an operating station. The invention is particularly suited for handling vials which, after stabilization at the operating station, are transferred vertically from the station, operated upon, and then returned along the vertical path to the station.

2. Description of the Prior Art

U.S. Patent Applications Nos. 754,815 (Kampf) and 754,814 (Kampf et al.), filed Dec. 27, 1976, for SAMPLE HANDLING APPARATUS, and U.S. Pat. No. 3,859,528 (Luitweiler, Jr. et al.) all assigned to the assignee of the present invention, illustrate prior commercial sample handling apparatus for scintillation spectrometers such as gamma counters or liquid scintillation counters. In the illustrated apparatus, a plurality of sample vials are circulated past an operating station. The vials are supported within respective compartments of multi-compartment sample holders, and the holders are circulated in rectilinear fashion around the sample storage compartment of the apparatus past the operating station. At the operating station an elevator engages the bottom of a vial, drives the vial vertically upward out of the holder compartment through a vertical passage into a radiation measuring chamber for analysis, and thereafter lowers the vial back into the compartment. The sample holder is then indexed laterally to position a next vial at the station and the next vial is removed, measured, and returned in similar fashion.

Malfunctions of the foregoing apparatus have occurred when a sample vial jams between the sample holder and measuring chamber during its vertical travel. To minimize vial jamming, the vial, the vial holder, and the vertical passage into the measuring chamber are suitably dimensioned and configured to stabilize and guide the vial during vertical movement. For example, the opening of the vertical passage is disposed above and relatively close to the top of a vial at the operating station and is flared outwardly and downwardly to provide a guiding and camming surface for guiding a vial into the vertical passage. Consequently, even if a vial is slightly tilted or misaligned at the operating station, it will still in most cases be successfully elevated to the detection chamber.

Unfortunately, while the flared opening in the vertical passage assists in guiding the vial during upward movement, it increases the likelihood of jamming on the return trip of the vial from the measuring chamber to the sample holder. In this regard, as the vial is lowered it is possible for the bottom of the vial to shift laterally away from the vertical after leaving the vertical passage and before reaching the sample holder. If this occurs, the vial bottom can strike and jam on the top of the sample holder without entering the proper sample compartment. In an effort to minimize such possibility, the apparatus in the foregoing applications includes a stabilizing mechanism for stabilizing the sample holder at the operating station to at least prevent the holder from being misaligned. However, even an accurately stabilized holder cannot prevent the described jamming of a laterally shifted vial.

In U.S. Patent No. 3,270,202 (Long et al.), a sample vial at an operating station is guided vertically upwardly into a detection chamber by an enshrouding cylindrical hood which surrounds the vial at the operating station. The hood is normally recessed upwardly into the shield or well of the detection chamber. With the hood thus recessed, a sample vial is horizontally moved into position at the operating station beneath the detection chamber. With the sample thus positioned, the hood is then lowered from the well to surround the sample vial and hence provide a circumscribing channel for guiding the vial upwardly into the chamber. After a measuring operation, the vial is lowered to the operating station through the hood. With the vial thus returned to its holder, the hood is retracted to permit horizontal movement of the vial away from the operating station.

While the Long et al. apparatus does function satisfactorily to guide the sample vials during vertical movement, it has several disadvantages which reduce its attractiveness for use in commercial instrumentation. In this regard, the Long apparatus requires a separate motor, transmission, rack and pinion gearing, microswitches, and a relay holding circuit for controlling the vertical travel of the enshrouding hood. Consequently, the mechanical and electrical complexity and the cost of such a system become limiting factors in its use. As a result, a need exists for a sample vial guide which can accommodate horizontal movement of a sample vial into and out of an operative position and vertical movement to and from the operative position without the need for the complex control arrangement of the prior art. The present invention fulfills these needs.

SUMMARY OF THE INVENTION

The present invention resides in a sample vial guide for stabilizing and horizontally and/or vertically guiding a sample vial between operating stations. The guide is simple in construction, reliable in operation, and readily adapted for use in commercial spectrometers.

Basically, the guide is located at a first operating station for a vial and includes first and second jaws disposed in an opposing relationship at the station on opposite sides of a horizontal path traversed by the vial in reaching the station. The jaws are internally shaped to receive and maintain the vial in a vertical operative postion at the first station ready for vertical movement through a top opening in the guide to a second operating station. The jaws are supported for lateral movement relative to each other and in a direction transverse to the horizontal path between closed and open positions. In the closed position the guide constrains the vial in its operative position between the jaws while in the open position the guide permits horizontal vial movement into and out of such operative position.

Preferably the jaws are spring biased toward each other and include inner and outer cam surfaces. The outer cam surfaces engage the vial as it moves along the horizontal path to the first operating station to move the jaws to the open position and accommodate further horizontal movement of the vial to the vertical operative position. At the first station the spring biasing automatically returns the jaws to the closed position to enclose the vial for vertical and guided movement between the first and second operating stations. The inner cam surfaces engage the vial as it moves along the horizontal path from the operative position to again move the jaws to the open position and accommodate horizontal movement of the vial from the first operating station and automatic return of the jaws to the closed position by the spring biasing means.

DESCRIPTION OF THE PREFERRED EMBODIMENT

Figure 1:
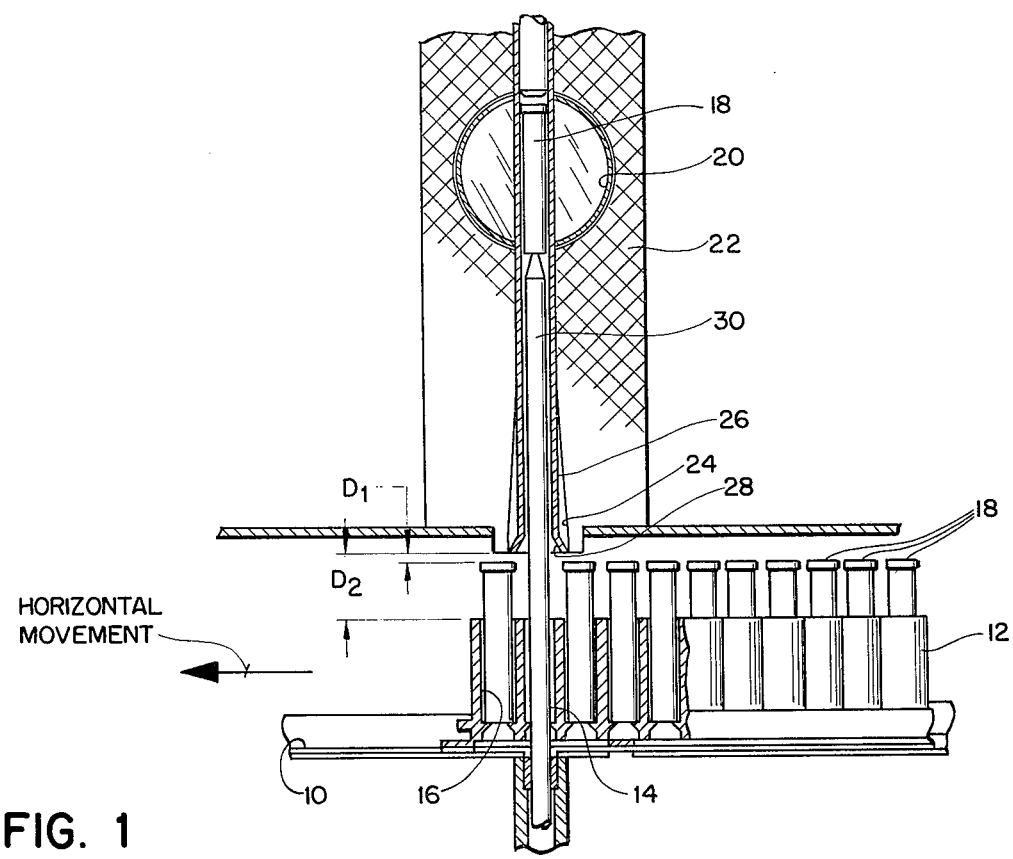
FIG. 1 is a fragmentary sectional view, taken in a generally vertical plane, through a prior art sample handling apparatus for scintillation spectrometers. The figure illustrates a multi-compartment sample vial holder the vials of which are horizontally indexed into position at an operating station below a detection chamber, and further illustrates one vial raised into the detection chamber by an elevator mechanism.

Referring now to the drawings, FIG. 1 illustrates a portion of the sample handling apparatus of a prior art scintillation spectrometer as found in aforementioned U.S. Pat. No. 3,859,528 and copending applications Nos. 754,815 and 754,814. The apparatus includes a sample compartment 10 within which a sample holder 12 is moved horizontally (in the direction of the arrow) past an operating station 14. The sample holder includes a plurality of cylindrical compartments 16 each of which are adapted to receive a corresponding sample containing vial 18.

The spectrometer of FIG. 1 includes a radiation detection chamber 20 above the sample compartment 10 and including, for example, one or more photomultiplier tubes (not shown) surrounded by a shielding block 22 of lead or other suitable shielding material. A vertical access passage 24 extends through the shielding block 22 between the detection chamber and the operating station 14. Preferably a cylindrical tubular sleeve 26 lines the interior wall of the access passage and extends upwardly through the counting chamber. As illustrated, the interior walls of access passage 24 and sleeve 26 are tapered outwardly and downwardly at their lower end to provide a flared or funnel-shaped lower opening 28 into the access passage.

An elevator mechanism 30, which is normally positioned beneath the sample compartment 10, is employed to remove a sample vial 18 from compartment 16 of sample holder 12 and to vertically drive the vial up into the detection chamber 20. FIG. 1 illustrates the elevator holding a sample vial within the detection chamber. After the sample has been measured, the elevator is lowered to return the vial 18 to the sample holder 12. The sample holder is then moved horizontally (by conventional means not shown) to position another vial at the operating station, and the elevator is again actuated in a conventional manner to drive this vial into the detection chamber.

Still referring to FIG. 1, when a sample vial 18 is in position at the operating station 14, the top of the vial is spaced a relatively short distance $D_1$ from the lower opening 28 of access passage 24. When the vial is elevated, it engages the flared surface of opening 28 which functions to cam or guide the vial into the vertical access passage 24. This prior guiding arrangement generally has been successful in preventing the sample vial from jamming during upward movement from the operating station.

It will be noted from FIG. 1 that the height of sample holder 12 is less than the height of vials 18 such that the top of the sample holder is spaced a distance $D_2$ from the lower opening 28 of access passage 24 greater than distance $D_1$. This is by design to permit the sample holder to accommodate sample vials of differing heights. However, when a sample vial is being lowered into compartment 16 of the sample holder, the bottom of the sample vial must traverse this greater distance $D_2$ in perfect alignment with the opening in compartment 16 of the sample holder. It has been discovered that sometimes during downward movement between lower opening 28 and the top of compartment 16, the bottom of the sample vial can shift laterally out of alignment with the compartment 16 and hence strike and lodge or jam on the upper edge of the sample holder 12. Such a malfunction typically requires operator intervention to clear and, apart from this inconvenience, can result in a broken vial or other disruptions in operation of the associated spectrometer.

Figure 2:
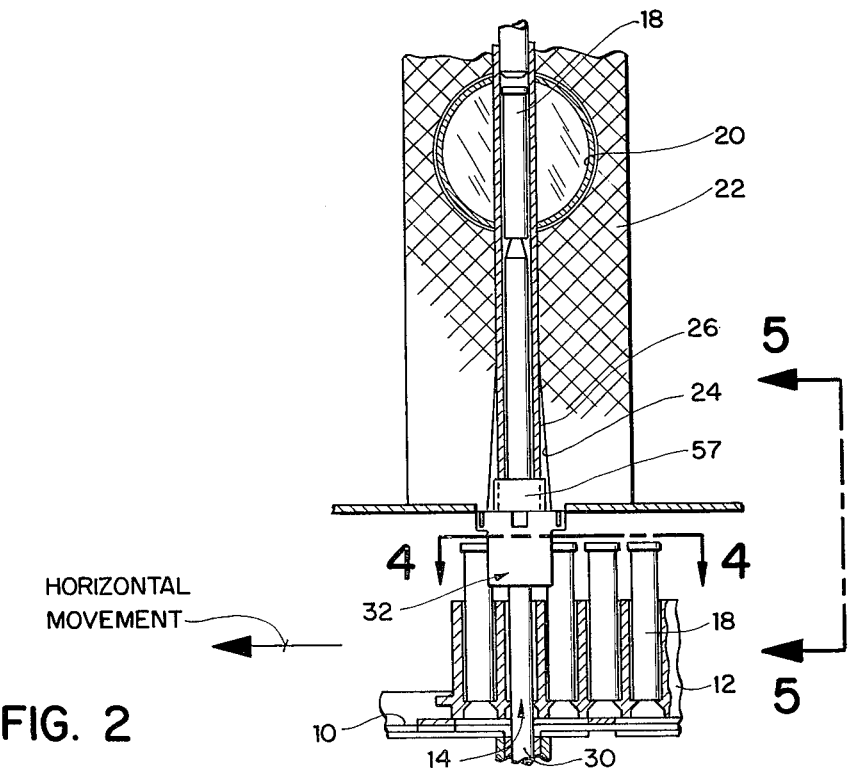
FIG. 2 is a view similar to FIG. 1 illustrating sample handling apparatus incorporating the sample vial guide of the present invention.

Referring now to FIG. 2, the present invention resides in a sample vial guide 32 aligned with and above the operating station 14 for stabilizing a sample vial 18 at the operating station and for guiding the sample vial to and from the operating station along the horizontal path within storage compartment 10 and along the vertical path between the operating station and the detection chamber 20.

Figure 3:
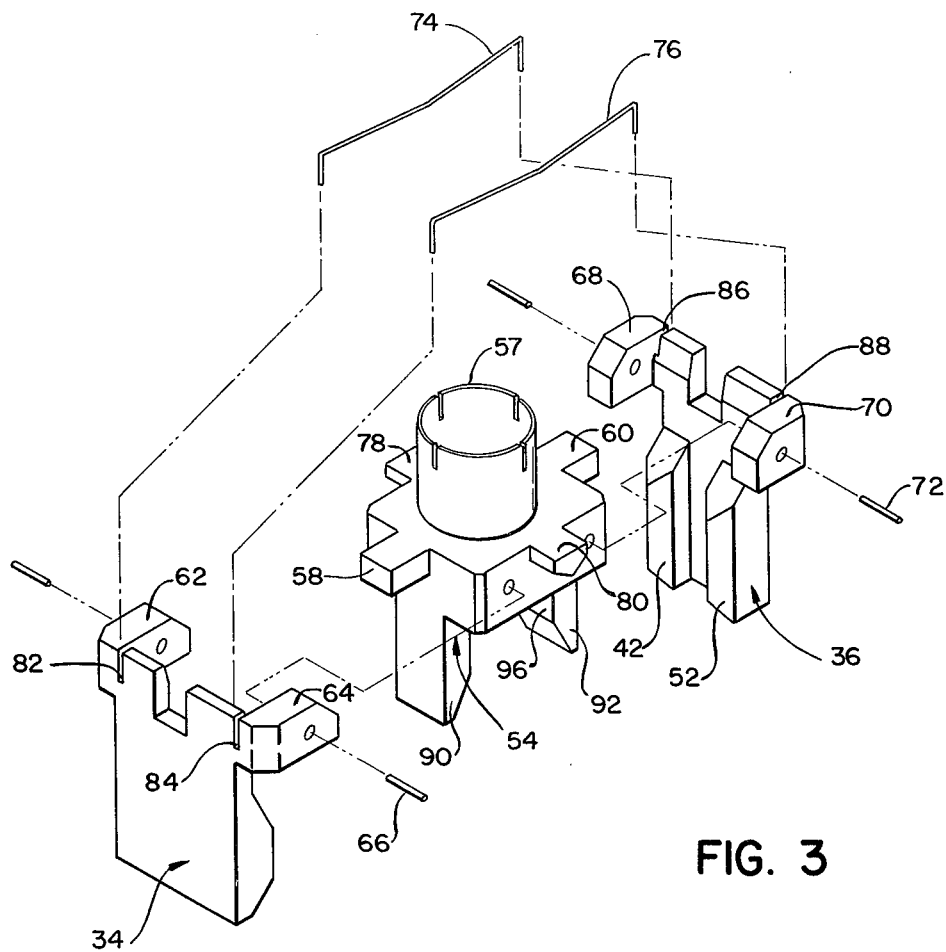
FIG. 3 is an exploded, perspective view illustrating the elements of the sample vial guide of the present invention.
Figure 4:
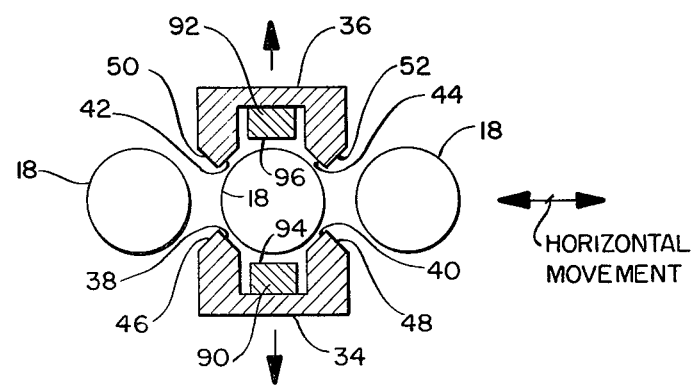
FIG. 4 is a diagrammatic view, taken in a generally horizontal plane, through the operating station of the sample handling apparatus of FIG. 2 and illustrates one sample vial within the constrained area of the guide and second and third vials along the horizontal path on opposite sides of the station.

For this purpose, referring to FIGS. 3 and 4, the sample vial guide includes a first jaw 34 and a second jaw 36 extending generally vertically in opposing relationship to each other on opposite sides of the horizontal path at the operating station 14. As illustrated in FIG. 4, the jaws have a generally U-shaped cross section in a horizontal plane and together define therebetween a constrained area at the operating station 14 within which a sample vial is retained and registered in operative position at the operating station.

Camming surfaces on the inwardly extending legs of jaws 34 and 36 are all illustrated in FIG. 4. In this regard, the first jaw 34 includes vertically extending inner cam surfaces 38 and 40 for engaging sample vial 14, while second jaw 36 has corresponding inner cam surfaces 42 and 44. Similarly, the first jaw 34 further includes vertically extending outer cam surfaces 46 and 48, while second jaw 36 includes corresponding outer cam surfaces 50 and 52.

Jaws 34 and 36 are supported at the operating station 14 by means of a support block 54 mounted above the operating station. Both the jaws and the support block are preferably formed of a durable plastic. The support block includes a vertical opening 56 (FIG. 5) therethrough aligned with access passage 24 to the detection chamber. For this purpose, a tubular sleeve 57 extends upwardly from the block and telescopes with the sleeve 26 in access passage 24. Horizontally disposed tabs 58 and 60 extending from the support block 54 may be employed to secure the support block in position. For this purpose screws or other appropriate fasteners may be threaded through the tabs into the shield block 22 or other supporting structure above the operating station 14.

In accordance with a primary aspect of the present invention, the jaws 34 and 36 are hinged to the support block 54 to pivot laterally relative to each other in a direction transverse to the horizontal path of the sample vials. For this purpose, inwardly directed arms 62 and 64 (FIG. 3) at the top of first jaw 34 are pivoted about horizontally extending pin 66 which extends through corresponding openings in a left side of the block 54 parallel to the horizontal path. Second jaw 36 has identical arms 68 and 70 correspondingly pivotally supported by a horizontally extending pin 72 at a right side of the block 54.

Figure 5:
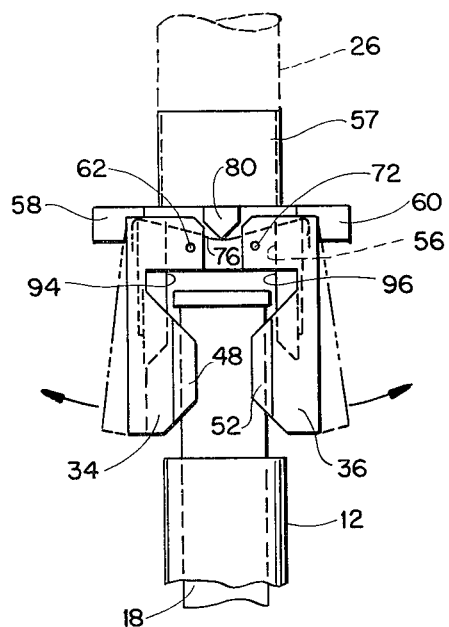
FIG. 5 is a fragmentary and diagrammatic view, taken generally along line 5 in FIG. 2, illustrating in solid line the jaws of the sample vial guide in a closed position and illustrating in phantom outline the jaws in an open position.
Figure 6:
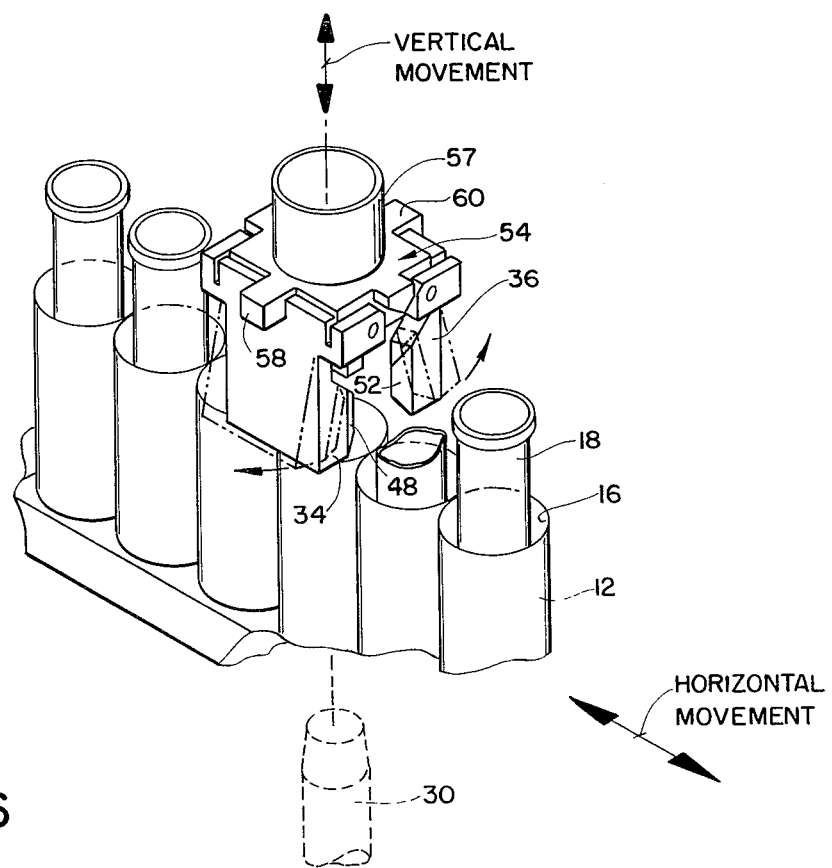
FIG. 6 is a fragmentary perspective view illustrating the relative positions of a sample vial holder and the sample vial guide at the operating station. The jaws of the sample vial guide are illustrated in phantom outline in an open position.

So pivoted, jaws 34 and 36 are adapted to move laterally between a closed position as illustrated in FIGS. 4, 5, and 6 for constraining a sample vial 18 at the operating station 14 and an open position as illustrated in phantom outline in FIGS. 5 and 6 for accommodating horizontal movement of a sample vial to or from the operating station. In this regard, biasing means, comprising a pair of straight wire springs 74 and 76 (FIG. 3) are employed to bias jaws 34 and 36 into a normally closed position. The mid points of springs 74 and 76 are restrained beneath tabs 78 and 80 extending horizontally from the front and back of support block 54. Outer ends of springs 74 and 76 are received by vertical slots 82, 86 and 84, 88 in jaws 34 and 36, respectively. The slots are situated laterally outward of corresponding pins 66 and 72 such that the outer ends of the springs supply a downward force on each jaw tending to pivot the bottom of each jaw inwardly toward its closed position. In conjunction with or as an alternative to springs 74 and 76, the jaws 34 and 36 could be sufficiently weighted at a location laterally outward of corresponding pins 66 and 72 such that gravity would supply a sufficient downward biasing force to pivot each jaw into its closed position.

The closed position of jaws 34 and 36 is defined by legs 90 and 92 which extend vertically from the support block 54 on opposite sides of the horizontal path. As illustrated in FIG. 4, in their extreme laterally inward movement, jaws 34 and 36 abut outer surfaces of corresponding legs 90 and 92 and are thus restricted from further inward movement.

Inner vertical surfaces 94 and 96 of corresponding legs 90 and 92 further provide an extension of vertical access passage 24. In this regard, the inner surfaces are laterally separated by slightly more than the outer diameter of the vial 18 and cooperate with the inner cam surfaces 38, 40, 42, and 44 to constrain the vial at the operating station 14. Further the vertical surfaces 94 and 96 guide the vial during its movement to and return from detection chamber 20.

In operation, the first and second jaws 34 and 36 are biased by springs 74 and 76 into the closed position illustrated in FIG. 4. Assuming horizontal movement of sample vial 18 to the left in the figures, the sample vial to be moved into operative position at the first operating station first engages outer camming surfaces 48 and 52 on jaws 34 and 36. As the vial 18 continues horizontal movement it cams the jaws apart toward their open position. When the jaws reach such open position, vial 18 engages opposing inner cam surfaces 40 and 44 such that the jaws begin to close. When completely closed the vial 18 is held and stabilized within the constrained area defined by the six inner surfaces 38, 94, 40, 44, 96, and 42. It should be noted that in the closed position, the inner surfaces do not grip the vial. Thus, the vial is free to move vertically to the counting chamber upon lifting by the elevator 30.

In particular, with the vial 18 constrained and stabilized at the operating station 14, elevator 28 is actuated in a conventional manner to drive the vial vertically into the counting chamber 20. There, sample in the vial is analyzed and the vial then returned to the holder 12 at the operating station. During return travel, the six inner surfaces previously mentioned serve to guide the vial back into compartment 16 of the holder 12 and thus preclude the vial from striking and jamming on the holder.

After return to the operating station 14, the vial is then again moved horizontally to engage inner camming surfaces 38 and 42 (FIG. 4) to again drive the jaws toward their open position. Simultaneously, if a second vial is contained in the adjacent compartment 16, this latter vial will engage outer cam surfaces 48 and 52 to assist in urging the jaws laterally apart. When the jaws have attained their open position, the first vial then engages outer camming surfaces 46 and 50 while the second vial simultaneously engages inner surfaces 40 and 44 so that further horizontal movement allows the jaws to return to their closed position under the action of springs 74 and 76.

While horizontal motion of the vial has been described in one direction only, it will be noted that the jaws 34 and 36 can be opened by vials 18 moving in either horizontal direction. Thus holder 12 can be moved to the left or to the right at will.

From the foregoing it will be evident that the sample vial guide of the invention accommodates horizontal vial movement and yet serves to guide and stabilize a vial in an operative position at the operating station. The guide requires no motors, transmission, relays or other complicated control devices for its operation. Moreover, it facilitates and guides vertical travel of a vial from the operating station to a further station and particularly enables safe return of the vial to the operating station without jamming.

While a preferred embodiment of the invention possessing the above-identified features has been illustrated and described in some detail, it will be apparent that modifications may be made therein without departing from the spirit and scope of the invention as defined in the appended claims.

What is claimed is:

1. In apparatus for moving sample vials along a generally horizontal path toward a first operating station and for transferring a vial in an operative position at said first operating station upwardly in a generally vertical path through an access passage toward a second operating station and for subsequently returning the vial along said vertical path to said first operating station for movement along said horizontal path away from said first operating station, the improvement comprising means for guiding each vial into position at said first operating station and constraining the vial thereat which includes:
  first and second jaws disposed in an opposing relationship at said first operating station and depending generally vertically on opposite sides of said horizontal path and being shaped to accommodate a sample vial therebetween in said operative position; and
  means supporting said first and second jaws for lateral movement relative to each other in a direction transverse to said horizontal path between a closed position for constraining said vial in said operative position and an open position laterally outward thereof for accommodating movement of said vial along said horizontal path.

2. The apparatus of claim 1 further including:
  an outer cam surface on at least one of said jaws for engaging said sample vial as it moves along said horizontal path to said first operating station to move said one jaw to said open position and to accommodate further horizontal movement of said vial to said operative position and return of said jaw to said closed position; and
  an inner cam surface on at least one of said jaws for engaging said sample vial as it moves along said horizontal path from said operative position to move said one jaw to said open position and to accommodate horizontal movement of said vial from said first operating station and return of said jaw to said closed position.

3. The apparatus of claim 2 further including one of said outer and inner cam surfaces on each of said first and second jaws for accommodating lateral movement of both jaws between said closed and said open positions.

4. The apparatus of claim 3 wherein said means supporting said first and second jaws includes hinge means supporting said jaws for outward and inward swinging motion on horizontally extending axes on opposite sides of said path to swing between said closed and open positions in response to horizontal movement of said vial engaging said cam surfaces.

5. The apparatus of claim 4 further including means for normally biasing said first and second jaws into said closed position such that said camming action between said sample vial and said camming surfaces opposes the biasing force of said biasing means.

6. The apparatus of claim 5 further including a support member above said first operating station having a vertical opening therethrough aligned with said access passage to accommodate movement of said vial between said first and second operating stations, said support member including first and second generally vertical inner guide surfaces extending therefrom on opposite sides of said horizontal path for constraining transverse lateral movement of said vial in said operative position while accommodating horizontal movement of said vial to and from said operative position and for guiding said vial during vertical movement thereof out of and into said operative position.

7. The apparatus of claim 6 wherein:
  said first and second inner guide surfaces are formed on corresponding first and second tabs depending from said support member; and
  said hinge means include pin means extending into said support member to support said first and second jaws with inner surfaces thereof abutting outer surfaces of said tabs to limit lateral inward movement of said jaws in said closed position.

* * * * *